United States Patent
Gier et al.

(10) Patent No.: US 10,041,353 B2
(45) Date of Patent: Aug. 7, 2018

(54) BLADE CASCADE AND TURBOMACHINE

(71) Applicant: MTU Aero Engines AG, Munich (DE)

(72) Inventors: Jochen Gier, Karlsfeld (DE); Yavuz Guendogdu, Munich (DE); Karl Engel, Dachau (DE)

(73) Assignee: MTU Aero Engines AG, Munich (DE)

( * ) Notice: Subject to any disclaimer, the term of this patent is extended or adjusted under 35 U.S.C. 154(b) by 430 days.

(21) Appl. No.: 14/452,594

(22) Filed: Aug. 6, 2014

(65) Prior Publication Data
US 2015/0044038 A1    Feb. 12, 2015

(30) Foreign Application Priority Data
Aug. 6, 2013    (EP) .................... 13179349

(51) Int. Cl.
*F01D 5/14* (2006.01)
*F01D 9/02* (2006.01)

(52) U.S. Cl.
CPC ............. *F01D 5/142* (2013.01); *F01D 5/143* (2013.01); *F01D 5/145* (2013.01); *F01D 9/02* (2013.01); *F05D 2250/611* (2013.01); *F05D 2250/711* (2013.01); *F05D 2250/712* (2013.01); *Y02T 50/673* (2013.01)

(58) Field of Classification Search
CPC .......... F01D 5/141; F01D 5/143; F01D 5/145; F01D 5/142; F01D 9/02; F05D 2250/711; F05D 2250/712; F05D 2250/611
See application file for complete search history.

(56) References Cited

U.S. PATENT DOCUMENTS

| | | | | |
|---|---|---|---|---|
| 2,918,254 | A * | 12/1959 | Hausammann | F01D 5/021 415/116 |
| 4,420,288 | A * | 12/1983 | Bischoff | F01D 5/145 415/914 |
| 6,213,711 | B1 * | 4/2001 | Muller | F01D 5/145 415/191 |
| 6,478,545 | B2 * | 11/2002 | Crall | B23K 20/129 29/889.1 |
| 6,561,761 | B1 * | 5/2003 | Decker | F04D 29/681 415/173.1 |
| 7,465,155 | B2 * | 12/2008 | Nguyen | F01D 5/143 415/191 |
| 7,690,890 | B2 * | 4/2010 | Aotsuka | F01D 5/143 415/191 |
| 8,807,930 | B2 * | 8/2014 | Green | F01D 5/141 415/191 |
| 2002/0127108 | A1 * | 9/2002 | Crall | B23K 20/129 416/213 R |

(Continued)

FOREIGN PATENT DOCUMENTS

| EP | 2 261 462 | 12/2010 |
|---|---|---|
| EP | 2 589 752 | 5/2013 |

(Continued)

*Primary Examiner* — Eldon Brockman
(74) *Attorney, Agent, or Firm* — Davidson, Davidson & Kappel, LLC

(57) ABSTRACT

A blade cascade of a turbomachine whose at least one side wall is configured to be circumferentially undulated and which has at least two elevations and at least one depression or at least two depressions having at least one elevation, as well as a turbomachine having a blade cascade of this kind.

16 Claims, 3 Drawing Sheets

(56) References Cited

U.S. PATENT DOCUMENTS

| | | | | |
|---|---|---|---|---|
| 2003/0170124 A1* | 9/2003 | Staubach | ............... | F01D 5/142 416/193 A |
| 2008/0232968 A1* | 9/2008 | Nguyen | ............... | F01D 5/143 416/193 R |
| 2010/0303627 A1* | 12/2010 | Megerle | ............... | F01D 5/143 416/179 |

FOREIGN PATENT DOCUMENTS

| | | |
|---|---|---|
| JP | 2009 209 745 | 9/2009 |
| WO | WO 98/44240 | 10/1998 |

\* cited by examiner

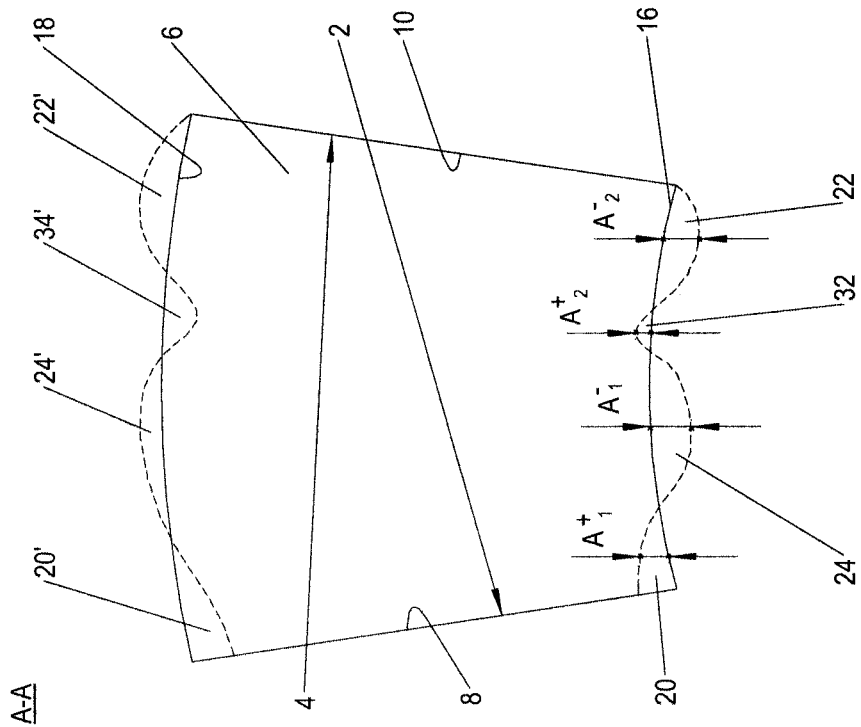
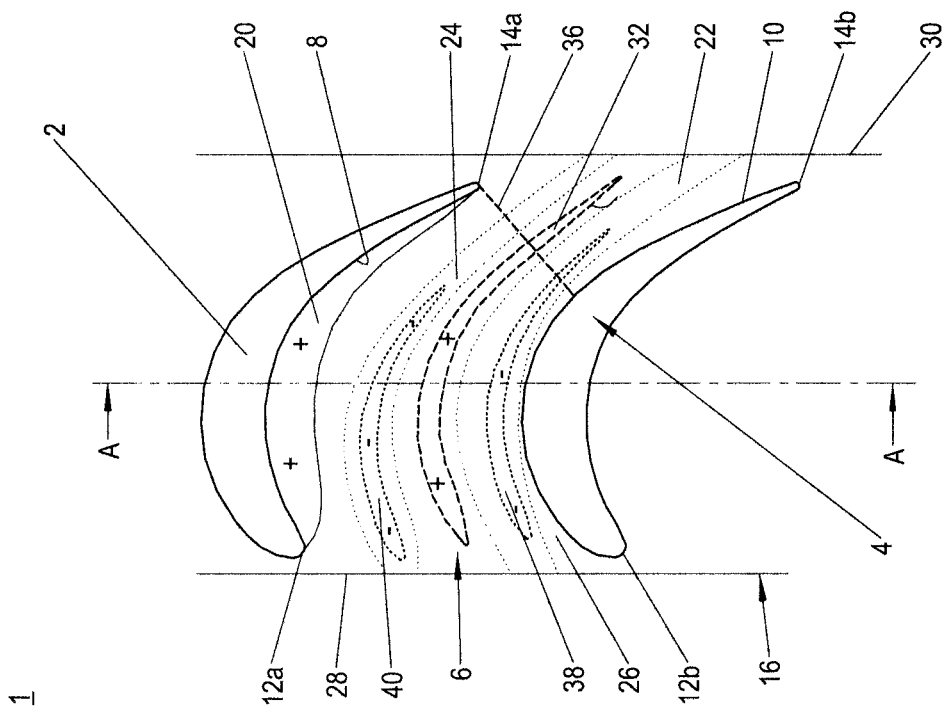

BLADE CASCADE AND TURBOMACHINE

This claims the benefit of European Patent Application EP 131 793 49.9, filed Aug. 6, 2013 and hereby incorporated by reference herein.

The present invention relates to a blade cascade of a turbomachine and to a turbomachine having such a blade cascade.

BACKGROUND

A primary, respectively main flow directed through a flow channel is deflected by a lateral pressure gradient parallel to the bounding wall. Since, due to the lower velocity thereof, flow layers proximal to the wall are deflected to a greater degree than flow layers distal to the wall, a secondary flow, respectively a channel vortex forms that is superimposed on the main flow, thereby leading, inter alia, to pressure losses. Such secondary flows regularly occur in blade cascades of turbomachines, such as gas and steam turbines. The blade cascades are composed of a plurality of circumferentially side-by-side disposed blades, respectively blades that are configured in an axially symmetrical flow channel and between each of which a blade channel is formed. The blade channels are radially bounded by a radially, outer housing-side side wall and by a radially inner, hub-side side wall. The sides walls are constituted, for example, of a stationary housing section, rotor sections, radially inner blade platforms and/or radially outer blade cover plates. The blade channels are each circumferentially bounded by a pressure-side and a suction-side blade wall. To reduce the secondary flows, contours in the form of elevations and/or depressions are frequently introduced into the side walls. The European Patent Application EP 2 261 462 A1 and the International Patent Application WO 98/44240 A1 describe examples of such, in particular circumferentially asymmetrical side-wall contours.

SUMMARY OF THE INVENTION

It is an object of the present invention to provide a blade cascade of a turbomachine having a reduced secondary flow, as well as a turbomachine having an enhanced efficiency.

The present invention provides a blade cascade of a turbomachine having a plurality of blade channels that are each circumferentially bounded by a pressure side of a blade and by an opposite suction side of an adjacent blade. The blade channels are each radially bounded by two opposing side walls. In each case, at least one side wall of the blade channels is provided with a side-wall contour. In accordance with the present invention, the side-wall contour is circumferentially undulated and has at least two elevations and at least one depression or at least two depressions and at least one elevation.

The side-wall contour according to the present invention brings about a reduction in secondary flow vortices and a reduction in deviations of a flow deflection angle from the blade cascade in the side wall-proximal area. The at least one side-wall contour makes it possible for the primary pressure gradients, in particular the circumferentially acting pressure gradients to be favorably and selectively influenced by the undulatory form. Forming at least one elevation that extends in the primary flow, respectively main flow direction, and at least one depression that extends in the primary flow direction, in each case in the rear region of the side wall, for example, also makes it possible for the at least one side-wall contour to influence and adjust the flow deflection angle in a way that allows a downstream cascade to experience a more favorable inflow distribution, thereby minimizing flow losses there. In addition, any interaction of horseshoe vortices induced at the leading edge of the blade with one another or with a channel vortex is thereby prevented or at least reduced.

The side-wall contour preferably extends to the downstream side-wall edge and thus to the rear axial gap. The downstream side-wall edge is hereby likewise configured to have an undulated form. The elevations and the at least one depression or the depressions and the at least one elevation may extend individually to the downstream side-wall edge. The side-wall contour may begin at the upstream side-wall edge, whereby the downstream side-wall edge may likewise be configured to have an undulated form, so that the upstream side-wall edge is likewise configured to have an undulated form. In principle, the side-wall contour may extend beyond the leading and trailing edges of the blades.

To influence the flow, the elevations and the at least one depression or the depressions and the at least one elevation may alternatively or additionally have widths that vary circumferentially and/or lengths that differ in the direction of flow.

To orient a flow deflection angle proximally to the side wall, it may be advantageous to configure the elevations and the at least one depression or the depressions and the at least one elevation behind a constriction region between the blades, normally to the same, i.e., in particular at an angle of 85° to 95°.

In the case of a plurality of depressions, it may also be advantageous for a plurality of depressions to merge transitionally into one depression. Alternatively, one depression may be subdivided into a plurality of depressions.

The elevations and the at least one depression or the depressions and the at least one elevation may have amplitudes that vary in the direction of flow. The elevations and the depressions may hereby have different heights, respectively depths in the direction of flow. The amplitudes of the elevations and the depressions may be maximally 30% of the blade pitch.

In addition, the flow is able to be influenced when, alternatively or additionally, the amplitudes of the elevations differ among each other, or the amplitudes of the depressions differ from one another in the flow direction and/or the circumferential direction. A pressure side-proximal elevation may have a greater amplitude than a pressure side-distal blade wall, for example. The elevation may also be planar, thus stepless and kink-free and, thus, merge smoothly into the suction-side turbine-blade wall. A suction side-proximal depression may have a greater amplitude than a suction side-distal depression, for example.

For the purposes of influencing flow, it may also be advantageous that the radii of curvature of the side-wall contour vary. An elevation preferably has a smaller radius of curvature than an adjacent depression.

A turbomachine according to the present invention has at least one blade cascade according to the present invention. Due to reduced secondary flows and a simultaneously more pronounced orientation of the particular flow deflection angle of the primary flow in a nominal direction, without sharp edges inducing additional vortices and thus mixing losses, a turbomachine of this kind has the distinguishing feature of an enhanced efficiency.

Other advantageous exemplary embodiments of the present invention constitute the subject matter of further dependent claims.

BRIEF DESCRIPTION OF THE DRAWINGS

Preferred exemplary embodiments of the present invention are described in greater detail in the following with reference to greatly simplified schematic representations, in which:

FIG. 2 shows a blade channel of a second exemplary embodiment of the blade cascade;

FIG. 3 shows a section along line A-A through the blade channel of FIG. 2;

DETAILED DESCRIPTION

Figure 1:
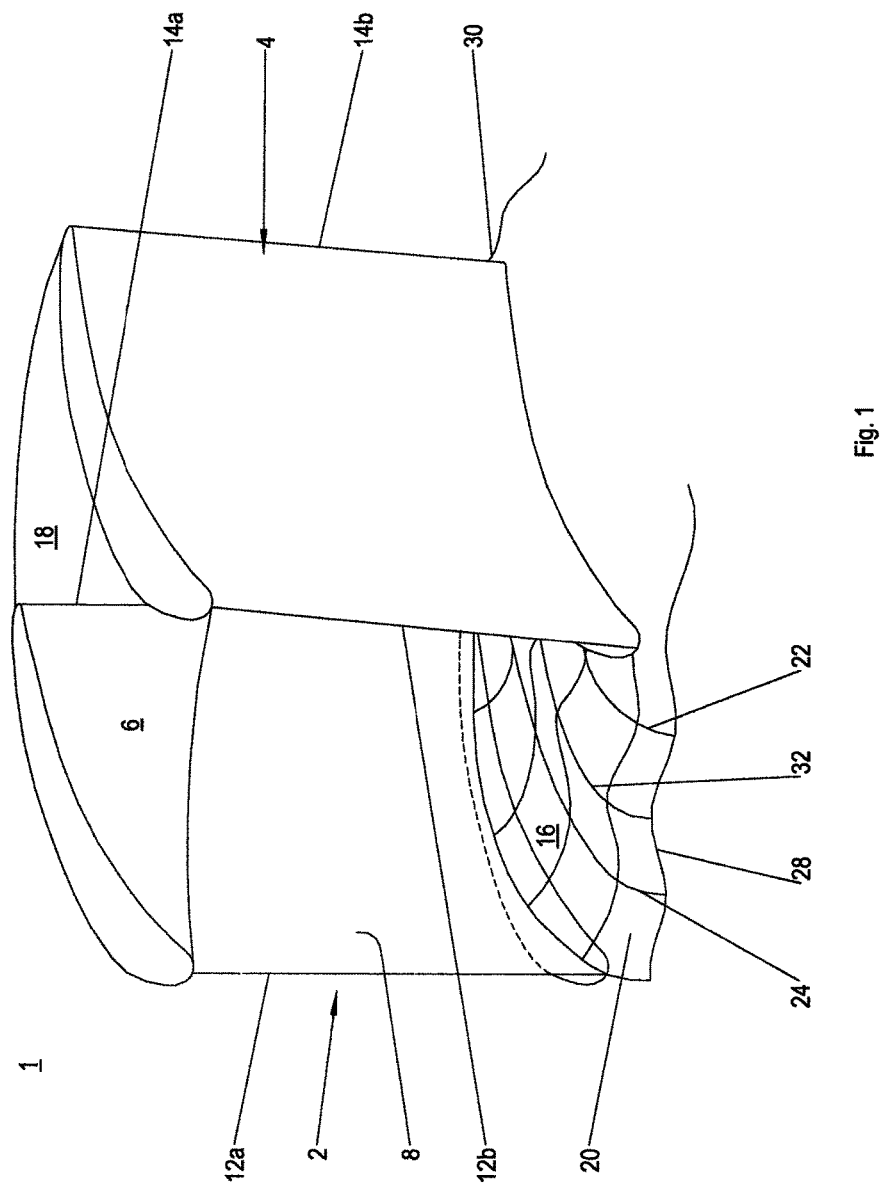
FIG. 1 shows a perspective front view of a blade channel of a first exemplary embodiment of a blade cascade according to the present invention.

FIG. 1 shows a perspective front view of a blade channel of a first exemplary embodiment of a blade cascade 1 according to the present invention of an axial turbomachine, such as a stationary gas turbine or an aircraft engine.

Blade cascade 1 is preferably configured on the turbine side and has a plurality of blades 2, 4 that are configured side-by-side in the circumferential direction of the turbomachine and each define a blade channel 6, which, in accordance with the representation in FIG. 1, is traversed from the front to the back, respectively from left to right by a main flow. In the circumferential direction of the turbomachine, respectively of blade cascade 1, blade channel 6 is bounded by a pressure side wall, respectively pressure side 8 of first blade 2 and by an opposite suction side wall, respectively suction side 10 of second blade 4. Suction side 10 is not visible in the perspective view in FIG. 1. Pressure side 8 and suction side 10 each extend between a leading edge 12a, 12b and a trailing edge 14a, 14b of blades 2, 4. In the radial direction of blade cascade 1, blade channel 6 is bounded by a hub-side side, respectively radially inner side wall 16. In addition, blade channel 6 is radially bounded by a housing-side, respectively radially outer side wall 18. Inner side wall 16 is formed by a rotor section or a blade platform, for example. Outer side wall 18 is formed by a housing section of a blade shroud, for example.

In the area of blade channel 6, at least inner side walls 16 are provided in accordance with the present invention with a circumferentially asymmetrical and with a circumferentially undulated side-wall contour. However, in the area of blade channel 6, at least only the outer side wall may also be provided with a circumferentially asymmetrical and with a circumferentially undulated side-wall contour. In the exemplary embodiment shown in FIG. 1, the side-wall contour has four individual contour features 20, 22, 24, 32 in the form of a pressure-side elevation 20, two depressions 22, 24, and an elevation 32 configured between the depressions.

In each instance, elevations 20, 32 and depressions 22, 24 refer to a non-contoured surface section 26 of inner side wall 16 (see, for example, FIG. 2). Elevations 20, 32 extend radially outwardly from non-contoured surface section 26 and thus constitute a channel narrowing. Depressions 22, 24 extend radially inwardly from non-contoured surface section 26 and thus constitute a channel widening.

The side-wall contour extends over the entire extent of inner side wall 16 and thus beyond leading edges 12a, 12b and trailing edges 14a, 14b. Thus, side-wall contour 16, respectively the two depressions 22, 24 thereof, and elevations 20, 32, extend from a leading side-wall edge 28 to a trailing side-wall edge 30 that is consequently likewise undulated in form.

Pressure-side elevation 20 extends along pressure side 8 of the one blade 2 from leading edge 12a to trailing edge 14a and merges smoothly into pressure side 8.

In the exemplary embodiment shown in FIG. 1, second elevation 32 is configured in the middle between depressions 22, 24. Thus, elevation 32 is flanked by depressions 22, 24 that merge directly into elevation 20 and into pressure side 8, respectively suction side 10. Elevation 32 and depressions 22, 24 extend in the flow direction and, therefore, are arcuately configured to conform with pressure side 8 and suction side 10.

As a general principle, elevations 20, 32 and depressions 22, 24 may have amplitudes that differ or are the same in the circumferential direction and in the direction of flow. Preferably, a maximum amplitude of elevations 20, 32 or of depressions 22, 24 is maximally 30% of a blade pitch of blade cascade 1.

FIGS. 2 and 3 show a blade channel 6 of a blade cascade 1 similar to that in FIG. 1. Here, however, a pressure-side connection of a pressure-side elevation 20 is different and, in fact, not planar as in FIG. 1, but orthogonal.

As shown in FIG. 2, at least inner side walls 16 are provided in the area of blade channel 6 with a circumferentially asymmetrical and with a circumferentially undulated side-wall contour. The side-wall contour has four contour features 20, 22, 24, 32 in the form of two elevations 20, 32 and two depressions 22, 24. Contour features 20, 22, 24, 32 are graphically represented by isohypses, respectively isobaths having a plus sign as a channel narrowing (elevation) or a minus sign as a channel widening (depression).

As indicated in FIG. 3 by the broken line in the area of outer side wall 18, this is likewise provided with a circumferentially asymmetrical side-wall contour that, considered circumferentially, is undulated, and that is composed of a plurality of contour features 20', 32' and 22', 24'. Inner and outer side-wall contours 16, 18 may be configured to be identical or to differ from one another. In addition, merely outer side wall 18 may be provided with a circumferentially asymmetrical side-wall contour.

The inner side-wall contour is explained in detail in the following.

As shown in FIG. 2, first elevation 20, respectively pressure-side elevation extends along pressure side 8 from leading edge 12a to trailing edge 14a. It merges orthogonally into pressure side 8.

Second elevation 32, respectively middle elevation is configured approximately in the middle between blades 2, 4. It extends from an axial position of leading edges 12a, 12b across a constriction region 36 between blades 2, 4 to an axial position of trailing edges 14a, 14b.

First depression 22, respectively suction-side depression is configured proximally to suction side 10. It extends in the direction of flow over entire side wall 16 from front side-wall edge 28 to rear side-wall edge 30. In the area of leading edge 12b and trailing edge 14b, it is spaced apart from blade 4 by a non-contoured surface section 26, but merges directly into suction side 10 in a blade that corresponds approximately to a 40% axial extent of blade 4.

Second depression 24, respectively pressure-side depression extends in the direction of flow over entire side wall 16 from front side-wall edge 28 to rear side-wall edge 30. In a front region of blade channel 6, pressure-side depression 24 is configured approximately in the middle between elevations 20, 32. In a rear region of blade channel 6, pressure-side depression 24 is positioned proximally to middle elevation 32 and distally from pressure-side elevation 20.

Depressions 22, 24 are circumferentially spaced apart from elevations 20, 32 over the entire length thereof, in each case by a non-contoured surface section 26. They each have a deepest portion 38, 40 that extends approximately from an axial position of leading edges 12a, 12b to an axial position that corresponds to approximately 70% to 80% of an axial blade width.

To positively influence a flow deflection angle proximally to the side wall, middle elevation 32 and depressions 22, 24 are oriented behind constriction region 36 normally to the same, i.e., at an angle of 85° to 95°.

In addition, as shown in FIG. 2, elevations 20, 32 and depressions 22, 24 have widths that differ in the direction of flow. Thus, in a position that corresponds to approximately 50% of an axial blade width thereof, elevations 20, 32 and depressions 22, 24 have the greatest width thereof and, at front blade wall edge 28 and rear blade wall edge 30, a small width.

As shown by the cross-sectional view in FIG. 3, in the circumferential direction, pressure-side elevation 20 has an amplitude $A^+_1$; middle elevation an amplitude $A^+_2$; pressure-side elevation 24 an amplitude $A^-_1$; and suction-side depression 22 an amplitude $A^-_2$. Amplitudes $A^+_1, A^+_2, A^-_1$ and $A^-_1$ may each vary in the axial direction.

In the illustrated exemplary embodiment, amplitude $A^+_1$ of pressure-side and pressure side-proximal elevation 20 is greater than amplitude $A^+_2$ or pressure side-distal middle elevation 32. As is also discernible in FIG. 3, pressure side-proximal elevation 20 merges transitionally, approximately orthogonally into pressure side 8. Amplitude $A^-_2$ of suction-side, respectively suction side-proximal depression 22 is greater than amplitude $A^-_1$ of suction side-distal depression 24.

Figure 4:
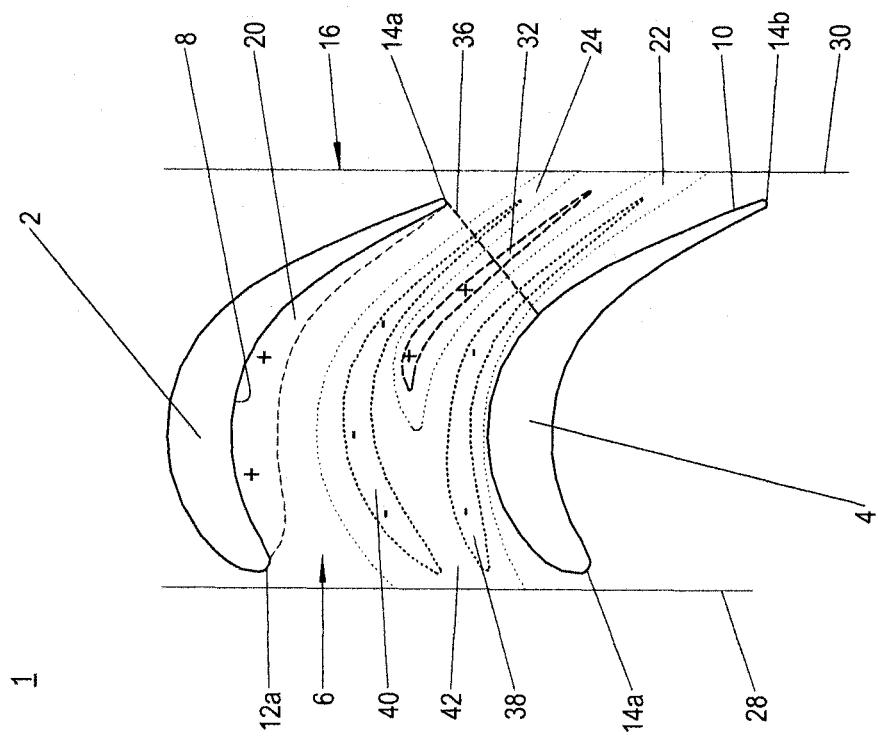
FIG. 4 shows a blade channel of a third exemplary embodiment of the blade cascade.

FIG. 4 shows a circumferentially undulated side-wall contour of an inner side wall 16 in a blade channel 6 between two blades 2, 4 of a blade cascade 1 of a turbomachine that has a pressure-side elevation 20, a middle elevation 32 and two depressions 22, 24 that merge transitionally into a rear, common depression 42.

Pressure-side elevation 20 extends along a pressure side 8 of blade 2 from a leading edge 12a of blade 2 to trailing edge 14a thereof.

Middle elevation 32 is positioned approximately in the middle between blades 2, 4. It extends approximately from one axial position of leading edges 12a, 12b of blades 2, 4 to an axial position that corresponds to approximately 60% of an axial blade width.

Depressions 22, 24 are configured laterally from middle elevation 32 and, in each case, spaced apart therefrom by a non-contoured surface section 26. Circumferentially, the widths thereof are approximately the same. In addition, pressure-side depression 24 configured between pressure-side elevation 20 and middle elevation 32 is spaced apart from pressure-side elevation by a non-contoured surface section 26. In the same way, suction-side depression 22 configured between blade 4 and middle elevation 32 is spaced apart from pressure-side elevation 20 by a non-contoured surface section 26.

Depressions 22, 24 extend from front side-wall edge 28 of side wall 16 and form common depression 42 downstream of middle elevation 32 that extends to rear side-wall edge 30 of side wall 16. The deepest portions 38, 40 thereof extend approximately from the axial position of leading edges 12a, 12b and, in a constriction region 36 between blades 2, 4, merge into a deepest portion 44 of common depression 42.

To positively influence the flow deflection angle proximally to the side wall, middle elevation 32 and common depression 42 are oriented behind constriction region 36 normally to the same, i.e., at an angle of 85° to 95°.

Figure 5:
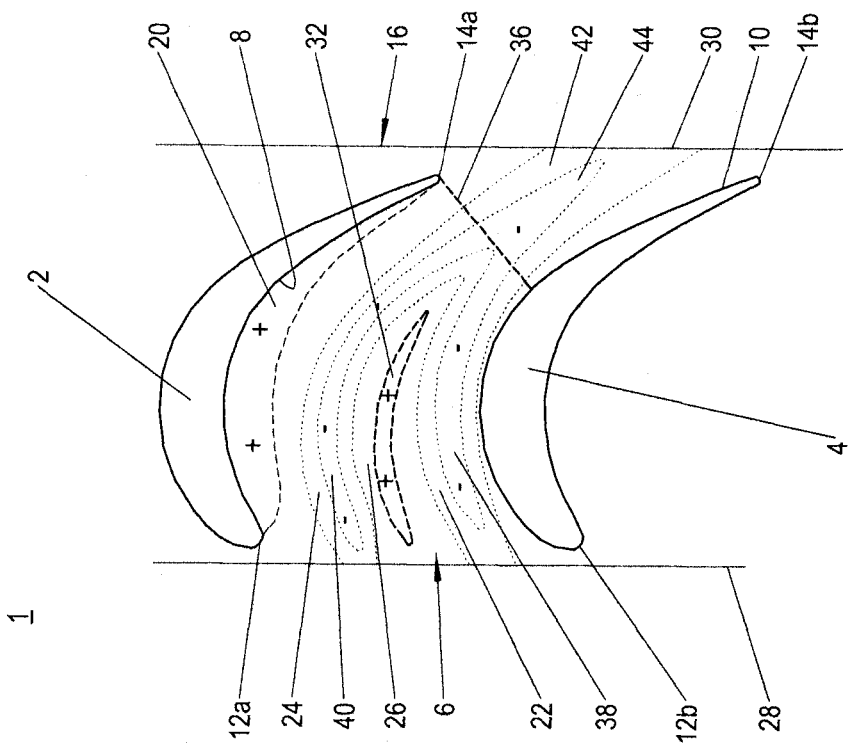
FIG. 5 shows a blade channel of a fourth exemplary embodiment of the blade cascade.

FIG. 5 shows a circumferentially undulated side-wall contour of an inner side wall 16 in a blade channel 6 between two blades 2, 4 of a blade cascade 1 of a turbomachine that has a pressure-side elevation 20, a middle elevation 32 and a depression 42 that are subdivided downstream into two depressions 22, 24. By dividing a front quasi common depression 42 on the leading side into two individual rear depressions 22, 24, advantages may be attained in combination with a favorable influencing of the main flow over a rear side-wall edge 30 of side wall 16.

Pressure-side elevation 20 extends along a pressure side 8 of blade 2 from a leading edge 12a of blade 2 to trailing edge 14a thereof.

Middle elevation 32 is positioned approximately in the middle between blades 2, 4. It extends approximately within a range of between 50% and 100% of an axial blade width. Thus, middle elevation 32 extends approximately from an axial middle blade channel region to the axial position of trailing edges 14a, 14b of blades 2, 4.

Depression 42 extends from a leading side-wall edge 28 of side wall 16 to a middle elevation 32. Middle elevation 32 divides depression 42 into two individual depressions 22, 24 that extend laterally of the same and that both extend to rear body edge 30 of side wall 16. As shown in FIG. 5, both depressions 22, 24 have an approximately same width in the circumferential direction. Depression 42 has two deepest portions 38, 40 that are spaced apart circumferentially and each continue individually into depressions 22, 24 to an axial position of rear edges 14a, 14b.

To positively influence the flow deflection angle proximally to the side wall, middle elevation 32 and depressions 22, 24 are oriented behind a constriction region 36 between blades 2, 4 normally to the same, i.e., at an angle of 85° to 95°.

As already mentioned in connection with FIG. 1, in all of the exemplary embodiments, elevations 20, 20', 32, 32' and depressions 22, 22', 24, 24', 42 refer in each case to a non-contoured surface section 26 of the inner side wall. Elevations 20, 20', 32, 32' extend radially outwardly from non-contoured surface section 26 and thus constitute a channel narrowing. Depressions 22, 22', 24, 24', 38, 42 extend radially inwardly from non-contoured surface section 26 and thus constitute a channel widening.

In addition, elevations 20, 20', 32, 32' and depressions 22, 22', 24, 24', 42 may have amplitudes that differ or are the same in the circumferential direction and in the direction of flow. The amplitudes of elevations 20, 20', 32, 32' and the amplitudes of depressions 22, 22', 24, 24', 42 are preferably maximally 30% of a blade pitch of blade cascade 1.

In the same way, the width of elevations 20, 20', 32, 32' and the width of depressions 22, 22', 24, 24', 42 may each vary circumferentially and longitudinally.

In addition, the radii of curvature of the undulation of the side-wall contour, respectively side-wall contours may vary circumferentially. Thus, an elevation 20, 20', 32, 32' may have a significantly smaller radius of curvature than an adjacent depression 22, 22', 24, 24', 42.

A blade cascade of a turbomachine is described whose at least one side wall is configured to be circumferentially undulated and has at least two elevations having at least one depression or at least two depressions having at least one elevation, as well as a turbomachine having a blade cascade of this kind.

LIST OF REFERENCE NUMERALS 1 blade cascade
2 blade
4 blade
6 blade channel
8 pressure side
10 suction side
12a, b leading edge
14a, b trailing edge
16 inner side wall
18 outer side wall
20, 20' pressure-side elevation
22, 22' depression
24, 24' depression
26 non-contoured surface section
28 leading side-wall edge
30 trailing side-wall edge
32, 32' elevation
36 constriction region
38 deepest portion
40 deepest portion
42 common depression
44 deepest portion

What is claimed is:

1. A blade cascade of a turbomachine comprising:
a plurality of blade channels each circumferentially bounded by a pressure side of a blade and by an opposite suction side of an adjacent blade, each blade channel radially bounded by two opposing side walls, at least one of the two side walls of the blade channels being provided with a side-wall contour, the side-wall contour being circumferentially undulated and comprising at least two elevations relative to a non-contoured surface of the at least one of the two side walls and at least one depression relative to the non-contoured surface of the at least one of the two side walls; wherein the amplitudes of the elevations differ from one another; and
wherein a plurality of depressions merge into the at least one depression.

2. The blade cascade as recited in claim 1 wherein the side-wall contour extends to a downstream side-wall edge.

3. The blade cascade as recited in claim 1 wherein the elevations and the at least one depression having widths that vary circumferentially or lengths that differ in the direction of flow.

4. The blade cascade as recited in claim 1 wherein the elevations and the at least one depression have amplitudes that vary in the direction of flow.

5. The blade cascade as recited in claim 1 wherein a pressure side-proximal elevation has a greater amplitude than a pressure side-distal elevation.

6. The blade cascade as recited in claim 1 wherein radii of curvature of the side-wall contour vary.

7. A turbomachine comprising at least one blade cascade as recited in claim 1.

8. A blade cascade of a turbomachine comprising:
a plurality of blade channels each circumferentially bounded by a pressure side of a blade and by an opposite suction side of an adjacent blade, each blade channel radially bounded by two opposing side walls, at least one of the two side walls of the blade channels being provided with a side-wall contour, the side-wall contour being circumferentially undulated and comprising at least two depressions relative to a non-contoured surface of the at least one of the two side walls and at least one elevation relative to the non-contoured surface of the at least one of the two side walls; wherein the amplitudes of the depressions differ from one another; and wherein a suction side-proximal depression has a greater amplitude than a suction side-distal depression.

9. The blade cascade as recited in claim 8 wherein the side-wall contour extends to a downstream side-wall edge.

10. The blade cascade as recited in claim 8 wherein the depressions and the at least one elevation have widths that vary circumferentially or lengths that differ in the direction of flow.

11. The blade cascade as recited in claim 8 wherein the depressions and the at least one elevation are configured downstream from a constriction region of the blade channel and normally to the constriction region.

12. The blade cascade as recited in claim 8 wherein a plurality of depressions merge into one of the depressions.

13. The blade cascade as recited in claim 8 wherein the depressions and the at least one elevation have amplitudes that vary in the direction of flow.

14. The blade cascade as recited in claim 8 wherein radii of curvature of the side-wall contour vary.

15. The blade cascade as recited in claim 8, wherein each of the depressions includes a trough.

16. A turbomachine comprising at least one blade cascade as recited in claim 8.

\* \* \* \* \*